March 1, 1949.  C. G. STEWART  2,463,213
CUTTING SHEARS

Filed March 1, 1946  2 Sheets-Sheet 1

Inventor
Charlie G. Stewart.

By Clarence A. O'Brien
and Harvey B. Jacobson
Attorneys

March 1, 1949.  C. G. STEWART  2,463,213
CUTTING SHEARS

Filed March 1, 1946  2 Sheets-Sheet 2

Inventor
Charlie G. Stewart.

By Clarence A. O'Brien
and Harvey B. Jacobson
Attorneys

Patented Mar. 1, 1949

2,463,213

UNITED STATES PATENT OFFICE 2,463,213

CUTTING SHEARS

Charlie G. Stewart, Birmingham, Ala.

Application March 1, 1946, Serial No. 651,110

1 Claim. (Cl. 30—186)

This invention relates to new and useful improvements and structural refinements in cutting shears, and the principal object of the invention is to provide a device of the character herein described, in which a novel assemblange of levers is employed to actuate the cutting jaws with relatively greater force as compared to that in shears of conventional design.

A further object of the invention is to provide cutting shears in which, by virtue of the construction above outlined, less force is required to operate the same, in order to perform a given cutting operation.

Another object of the invention is to provide shears which are of simple construction and which cannot easily become damaged.

With the above more important objects in view and such other objects as may become apparent as this specification proceeds, the invention consists essentially of the construction and arrangement of parts as shown in the accompanying drawings in which.

Like characters of reference are used to designate like parts in the specification and throughout the several views.

Figure 1:
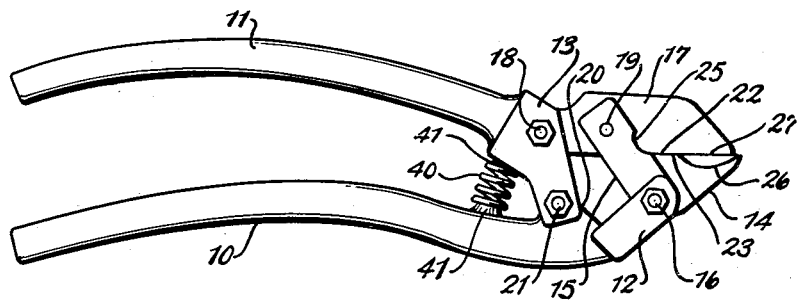
Figure 1 is a side elevation of the invention, showing the jaws thereof in the closed position.
Figure 2:
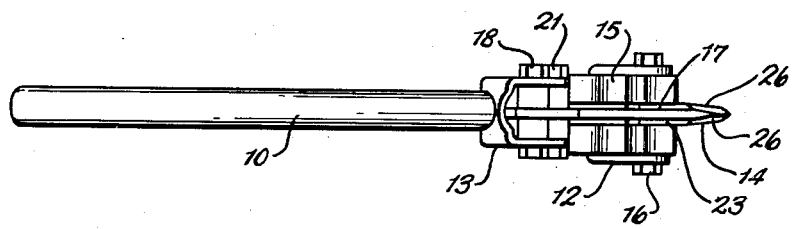
Figure 2 is a top plan view of the subject shown in Figure 1.
Figure 3:
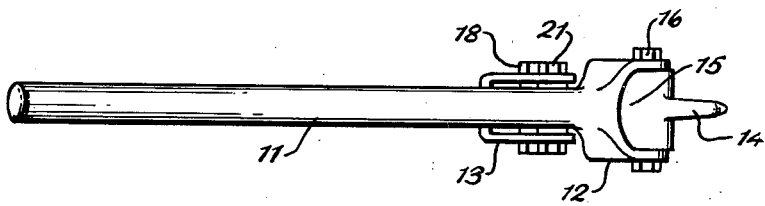
Figure 3 is an underside plan view of the same.
Figure 4:
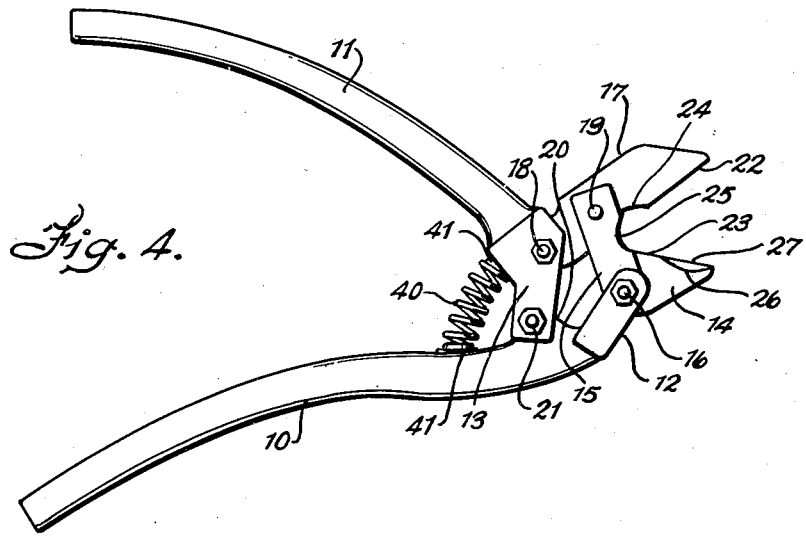
Figure 4 is a further side elevation, showing the jaws in the open position.

Referring now to the accompanying drawings in detail, the invention consists of a relatively long handle 10 and a relatively short handle 11, configurated substantially as shown and provided at one end thereof with the forked extremities 12 and 13 respectively.

A cutting jaw 14, provided integrally with a bifurcated yoke 15, defines a bell crank which, in turn, is pivotally connected at the fulcrum thereof to the forked extremity 12 by means of the bolt and nut 16.

A cutting blade 17 is pivoted at one end thereof to the forked extremity 13 by the bolt and nut 18, the blade 17 passing between the furcations of the yoke 15 and being pivotally connected thereto by means of the pin 19. The remaining, that is, the free end of the blade 17 co-acts with the jaw 14, as will be clearly apparent from the accompanying drawings.

The handle 10 is also provided adjacent the forked extremity 12 with a projecting boss or hub 20, and a further bolt and nut 21 passes through a suitable aperture formed in this hub, and pivotally connects the handle 10 to the forked extremity 13.

The blade 17 is provided with a sharp cutting edge 22 adjacent to the jaw 14, while the latter is formed with a substantially flat edge 23 adjacent to the blade. The blade 17 and the yoke 15 are also formed with co-acting recesses 24 and 25 respectively, and the flat edge 23 is sectionally relieved on both sides thereof as indicated at 26, to form a sharp edge 27 adjacent the free end of the jaw 14.

When the invention is placed in use, the recesses 24 and 25 will effectively grip and hold the work to be cut, and as the handles 10 and 11 and the associated jaws 14, 17 are drawn together, the recess 24 will gradually pass in between the furcations of the yoke 15, thus leaving the remaining recess 25 to urge the work toward the cutting edges 22 and 23.

Where additional cutting force is required, full advantage of the leverage may be utilized by cutting or nipping the work between the cutting edges 22 and 27.

Figure 5:
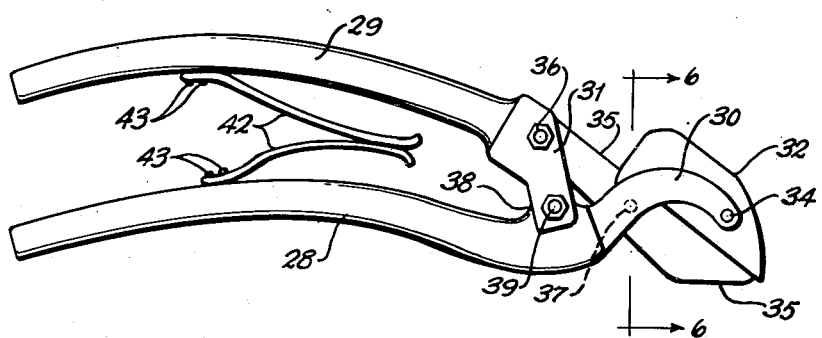
Figure 5 is a side elevation of a modified embodiment of the invention.
Figure 6:
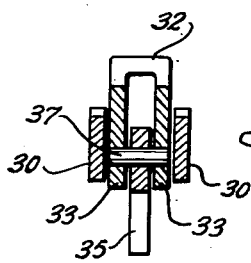
Figure 6 is a cross-sectional view, taken in the plane of the line 6—6 in Figure 5.

Referring now to the modified embodiment of the invention shown in the accompanying Figures 5 and 6, the same consists of the relatively long and short handles 28 and 29 respectively, provided with the respective forked extremities 30 and 31. The cutting jaw 32 is formed at one end thereof with the integral, bifurcated yoke 33, the jaw being pivoted by means of the pin 34 to the forked extremity 30.

The cutting blade 35 is pivoted at one end thereof to the forked extremity 31 by the bolt and nut 36, said blade passing between the furcations of the yoke 33 and being pivoted thereto by the pin 37.

The handle 28 is also provided with the hub 38, whereby it may be connected by means of the bolt and nut 39 to the forked extremity 31.

It will be noted that the yoke 33 and a portion of the blade 35 are disposed between the arms of the forked extremity 30, the latter being configurated substantially as shown in the accompanying drawings.

The jaw 32 co-acts with the remaining, that is, the free end of the blade 35, in a manner similar to that already described in connection with the aforementioned blade 17 and the jaw 14.

With reference to the two embodiments of the invention in general, means may be provided to assist in the opening of the jaws, the same consisting in the first embodiment of a suitable compression spring 40, positioned on suitable detents or spring seats 41, formed on the aforementioned handles 10 and 11.

In the second embodiment suitable leaf springs 42 may be employed, each being secured at one end thereof by the rivets 43 to the handles 28 and 29, the remaining ends of the springs contacting one another, as will be clearly apparent from the accompanying drawings.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

Cutting shears comprising in combination, a relatively short handle, a relatively long handle, a laterally projecting fork at one end of each of said handles, an elongated boss secured in transversely extending relation to said long handle adjacent the fork thereof, the end portions of the arms of the fork on said short handle straddling the ends of said boss and being pivotally connected thereto, a pair of opposed, mutually spaced blocks secured to the inner surfaces of said arms adjacent the end of said short handle, an elongated cutting blade, one end portion of said blade being disposed between and pivotally connected to said blocks, a cutting jaw formed with a thickened portion at one end thereof, said thickened portion being disposed between and pivotally connected to the arms of the fork on said long handle, a pair of mutually spaced furcations formed integrally with said thickened portion in angular relation with respect to said jaw, said furcations straddling the mid-portion of said blade and being pivotally connected thereto, the free end portion of said blade coacting with said jaw, and resilient means associated with said handles for normally spreading apart the same.

CHARLIE G. STEWART.

REFERENCES CITED

The following references are of record in the file of this patent:

UNITED STATES PATENTS

| Number | Name | Date |
|---|---|---|
| 1,710,554 | St. Pierre | Apr. 23, 1929 |
| 1,909,846 | Porter | May 16, 1933 |
| 1,995,044 | Smith | Mar. 19, 1935 |
| 2,239,852 | Lind | Apr. 29, 1941 |
| 2,308,684 | Geddes | Jan. 19, 1943 |
| 2,310,959 | James | Feb. 16, 1943 |